Patented Mar. 3, 1936

2,032,361

UNITED STATES PATENT OFFICE 2,032,361

METHOD OF MAKING COLORED RUBBER GOODS

Merrill E. Hansen, Akron, and Carl L. Beal, Cuyahoga Falls, Ohio, assignors to American Anode, Inc., Akron, Ohio, a corporation of Delaware No Drawing. Application December 29, 1932, Serial No. 649,336

15 Claims. (Cl. 18—58)

This invention relates to rubber manufacture and particularly to the manufacture of colored rubber articles directly from a liquid dispersion of rubber.

Direct methods for manufacturing articles from rubber dispersions such as latex recently have been the subject of a considerable amount of experimental and commercial development, and are now widely used in the production of certain types of rubber articles. These methods usually consist in dipping a shaped form, which may or may not embody a coagulant, into a rubber dispersion for a time sufficient to allow a rubber layer of a desired thickness to deposit upon the form. The deposition may be accelerated through the use of a heated form, or the dipping may be repeated several times, either with or without intermediate coagulant treatments. Finally, the rubber deposit is washed, dried, and vulcanized, either before or after the article is removed from the form.

It is frequently desirable to manufacture colored articles by the above described methods. This has been accomplished heretofore either by incorporating a suitable coloring material in the rubber dispersion from which the articles are to be made, or by applying a rubber soluble dye to the surfaces of the articles after their formation. These prior methods have not always proven satisfactory however, and difficulties have frequently been encountered in using them in commercial operations.

It is accordingly an object of the present invention to provide a highly satisfactory method of making colored rubber goods from rubber dispersions which will eliminate the disadvantages of methods heretofore used. It is a further object of the invention to provide such a method in which the rubber goods are colored by means of a dye formed within the rubber structure by the interaction of complementary dye-forming constituents introduced thereinto.

Broadly, the present invention comprises forming a rubber article directly from a liquid rubber dispersion by depositing rubber from the dispersion upon a shaped form, and introducing into the rubber deposit, while it is being formed, one or more dye-forming constituents adapted to diffuse into and throughout the rubber and there to react with complementary constituents to form a dye in situ.

Rubber, when freshly deposited from an aqueous dispersion, is not a dense material, as it is in finished rubber goods, but on the contrary, is extremely porous and contains a considerable quantity of water, often as much as 50% distributed through the porous structure. When such a water-containing porous rubber deposit is exposed to air, evaporation of the water begins immediately and as the drying continues a less porous rubber film rapidly forms over the surface of the article, followed by a gradual but steady densification of the entire rubber structure.

In the present invention, a dye-forming constituent is introduced into the rubber deposit not only before any densification has occurred, but simultaneously with the formation of the deposit so that the necessary diffusion of the dye constituent may proceed while the deposit is forming, before densification has begun, and while the deposit is in the highly porous condition most favorable to diffusion processes. This is accomplished by introducing the dye-constituent into the forming and freshly formed rubber deposit at the side thereof contiguous the form, the constituent being supplied from a coating applied to the form before its association with the rubber dispersion.

Although the result may be accomplished in other manners, the coating containing the dye constituent is preferably applied by coating a shaped impervious form with a fluid mixture containing the constituent dissolved in a volatile solvent such as an alcohol, ketone, ester, benzol, or even water, which at the same time, although this is not essential to the invention, may contain other material compatible with the dye constituent such as a coagulant, and/or a material such as mica, soapstone, diatomaceous earth, graphite, etc., capable of preventing adherence of rubber to the form. If necessary, a part of the volatile solvent may be evaporated from the coating to render it viscous and substantially non-flowing.

The form embodying the dye constituent is associated with an aqueous rubber dispersion or a coating of such a dispersion is applied to and coagulated upon the form in any of the manners usually employed in such work, whereupon the dye constituent will diffuse into the contiguous freshly formed microporous water-containing rubber layer and therein react with complementary constituents which may have been contained in the dispersion from which the rubber was deposited, or may have been applied to the exterior of the freshly formed layer and allowed to diffuse into the rubber in a manner similar to the diffusion of the dye constituent supplied at the face of the layer contiguous to the form.

When such diffusion and reaction of the dye constituents is complete, the article may be washed, dried, and vulcanized in the customary manner.

It is to be understood that the term "dye-forming constituent" as used herein includes not only compounds adapted to react and form the dye proper, but also setting agents such as inorganic salts, ammonia, phospho-tungstic acids, etc. and even gaseous fixing agents including air, and the lake forming dyes which require treatment with such setting or insolubilizing agents and like complementary materials familiar to dye chemists. Likewise, the term "dye" is used in a broad sense to include the final colored compound formed by the reaction of any of the above defined complementary dye-forming constituents.

The dispersion of rubber employed in manufacturing articles according to the invention may be a natural or artificial aqueous dispersion of caoutchouc, balata, gutta percha, or like natural or synthetic gum whether in the unvulcanized, vulcanized, or reclaimed condition. The dispersion may be diluted, concentrated, stabilized, thickened, thinned or otherwise modified and may contain any desirable vulcanizing, accelerating, age-resisting or like agents as well as fillers, softeners, and similar compounding ingredients usually employed in rubber compositions.

The following examples are given for purposes of illustration only and it is not intended to limit the discovery to any specific details which may be recited therein to indicate certain manners of practicing the invention.

*Example 1.*—A clean glazed porcelain glove form is immersed in a solution of 200 parts by weight of commercial calcium nitrate dissolved in 1000 c. c. of acetone containing a quantity dependent upon the color intensity desired in the finished product, of a diazonium chloride compound such as benzene diazonium chloride. The form is removed with an adherent coating of the solution and, with constant manipulation of the form to distribute the solution, a sufficient quantity of the acetone is evaporated to render the coating viscous and substantially non-flowing.

The coated form is then immersed in an aqueous dispersion containing concentrated latex, compounded in the usual manner with vulcanizing agents, age-resistors, and other desired ingredients, to which is added a quantity, dependent upon the color intensity desired, of a phenolic salt, such as sodium phenolate. Thereafter, calcium ions diffuse into the contiguous rubber dispersion and coagulate a continuously increasing coherent layer of rubber upon the form. Simultaneously, the diazonium chloride diffuses into the forming rubber layer and there reacts with the sodium phenolate contained in and deposited with the rubber from the dispersion, thereby forming within the rubber structure a dye which imparts a permanent color to the rubber article. After a rubber layer of the desired thickness has been deposited, the form is removed from the dispersion and is rotated or manipulated in air for several minutes to allow the rubber to set firmly. Thereafter, the rubber is washed, dried, and vulcanized in the usual manner. In some cases, it may be necessary to allow additional time to pass before washing the rubber to permit complete reaction of the water-soluble dye constituents.

*Example 2.*—An aluminum toy balloon form is dipped into a solution of 300 parts by weight of calcium chloride in 1000 c. c. of methanol containing 200 parts of suspended slate flour, removed from the liquid and a part of the methanol evaporated to produce a non-flowing coating containing the slate flour and calcium chloride upon the form.

The coated form is immersed in an aqueous dispersion containing concentrated latex compounded with vulcanizing agents, etc. and a quantity of a dye such as Metamine green B which requires a setting or fixing treatment to render it insoluble. The calcium chloride on the form supplies ions which coagulate a layer of rubber upon the form and simultaneously fixes or sets the green dye as the latter is deposited with the rubber from the dispersion.

The colored rubber is washed, dried, vulcanized, and stripped from the form as before, the stripping operation being facilitated in this case by the presence of the slate flour upon the form serving to prevent adherence of the rubber to the form.

*Example 3.*—An impervious form is dipped into a solution containing 200 parts by weight of commercial calcium nitrate and a suitable amount of Victoria blue dye dissolved in one liter of ethyl alcohol, the coating is at least partially dried and a layer of rubber is deposited on the form in the manner described. The freshly deposited article is then immersed for several minutes in a 15% solution of ammonia whereupon the ammonia reacts with or fixes the Victoria blue dye which will have diffused into the rubber from the coating upon the form. The dyed rubber is washed, dried, and vulcanized as usual.

In each of the above examples, the quantities of the dye constituents used may vary over a wide range and will be determined in each case according to the color properties desired in the finished article.

The method of the present invention is peculiarly adapted to the manufacture of multi-colored rubber articles. Various areas of the form may be coated with a number of different dye constituents which upon diffusion into the deposited rubber may react with one or more complementary constituents to form a plurality of dyes in the rubber. Likewise a single constituent may be introduced into the rubber at the face thereof contiguous the form, and a number of different complementary constituents may be applied to various portions of the exterior rubber surface to diffuse into and react with the first constituent after diffusion thereof into the rubber, thereby to form several dyes within the rubber structure and to produce a multi-colored article.

Numerous dye constituents other than those indicated may be employed in the process, limited only by their compatibility with materials with which association is necessary, and other modifications and variations may be made without departing from the spirit and scope of the invention as defined in the appended claims.

We claim:

1. The method of making colored rubber goods which comprises providing a form with a coating layer of rubber derived directly from a dispersion of rubber, introducing a dye-forming constituent into the rubber layer at the face thereof contiguous the form, and forming a dye in situ from said constituent.

2. The method of making colored rubber goods which comprises depositing a coating layer of rubber onto a form from an aqueous dispersion of rubber, during the deposition introducing a dye-forming constituent into the rubber layer at the face thereof continguous the form, and allowing the dye constituent to diffuse into the rubber layer and there reacting the said constituent with a complementary constituent to form a dye.

3. The method of making colored rubber goods which comprises depositing a coating layer of rubber containing a dye-forming constituent onto a form from an aqueous dispersion of rubber, during the deposition introducing into the rubber layer at the face thereof contiguous the form a complementary dye-forming constituent, and allowing the latter constituent to diffuse into the rubber layer and to react with the first constituent to form a dye in situ.

4. The method of making colored rubber goods which comprises depositing a coating layer of rubber onto a form from an aqueous dispersion of rubber, during the deposition introducing a dye-forming constituent into the rubber layer at the face thereof contiguous the form, introducing a complementary dye-forming constituent into the rubber layer at the opposite face thereof, and allowing the constituents to diffuse into the rubber and to react to form a dye in situ.

5. The method of making colored rubber goods which comprises applying to a form a coating containing a dye-forming constituent, then associating the coated form with an aqueous dispersion of rubber containing a complementary dye-forming constituent to deposit upon the form a layer of rubber containing the complementary constituent and allowing the first constituent to diffuse into the rubber layer and there to react with the second constituent to form a dye in situ.

6. The method of making colored rubber goods which comprises applying to a form a coating containing a dye-forming constituent, associating the coated form with an aqueous dispersion of rubber to deposit upon the form a layer of rubber, applying to the layer of rubber a complementary dye-forming constituent, and allowing the constituents to diffuse into the rubber layer and there to react and form a dye in situ.

7. The method of making colored rubber goods which comprises applying to a form a coating containing a coagulant and a dye-forming constituent, associating with the coated form a coagulable aqueous dispersion of rubber containing a complementary dye-forming constituent, and allowing the first constituent to diffuse into the resulting rubber layer and there to react with the second constituent to form a dye in situ.

8. The method of making colored rubber goods which comprises applying to a form a coating containing a dye-forming constituent and an adhesion-preventing material, associating the coated form with an aqueous dispersion of rubber to deposit upon the form a layer of rubber, allowing the dye constituent to diffuse from the coated form into the rubber layer, and forming a dye in situ from said constituent.

9. The method of making colored rubber goods which comprises applying to a form a coating containing a die-forming constituent, a coagulant, and an adhesion-preventing material, associating with the coated form a coagulable aqueous dispersion of rubber, and allowing the dye constituent to diffuse into the resulting rubber layer and there reacting the said constituent with a complementary constituent to form a dye.

10. The method of making colored rubber goods which comprises applying to a form a fluid mixture containing a dye-forming constituent in a liquid vehicle, removing the liquid vehicle at least in part to produce a substantially non-flowing coating containing the dye-forming constituent, associating the coated form with an aqueous dispersion of rubber to deposit upon the form a layer of rubber, and allowing the dye-forming constituent to diffuse into the rubber layer and there reacting the said constituent with a complementary constituent to form a dye in situ.

11. The method of making colored rubber goods which comprises applying to a form a fluid mixture containing a coagulant and a dye-forming constituent in a liquid vehicle, removing the liquid vehicle at least in part to produce a viscous coating containing the coagulant and the dye-forming constituent, associating with the coated form a coagulable dispersion of rubber, and allowing the dye-forming constituent to diffuse into the resulting coagulated rubber layer and there reacting the said constituent with a complementary constituent to form a dye in situ.

12. The method of making colored rubber goods which comprises applying to a form a fluid mixture containing an adhesion-preventing material and a dye-forming constituent in a liquid vehicle, removing the liquid vehicle at least in part to produce a substantially non-flowing coating containing the adhesion-preventing material and the dye-forming constituent, associating the coated form with an aqueous dispersion of rubber to deposit upon the form a layer of rubber, allowing the dye-forming constituent to diffuse into the rubber layer, and forming a dye in situ from said constituent.

13. The method of making colored rubber goods which comprises applying to a form a fluid mixture containing a dye-forming constituent in a volatile organic solvent, evaporating at least a part of the solvent to produce a substantially non-flowing coating containing the dye-forming constituent, associating the coated form with an aqueous dispersion of rubber to deposit upon the form a layer of rubber, allowing the dye-forming constituent to diffuse into the rubber layer, and forming a dye in situ from said constituent.

14. The method of making multi-colored rubber goods which comprises applying to a form a coating containing a plurality of dye-forming constituents, associating the coated form with an aqueous dispersion of rubber to deposit upon the form a layer of rubber, and allowing the dye-forming constituents to diffuse into the rubber layer and there reacting the said constituents with complementary constituents to form a plurality of dyes in situ.

15. The method of making multi-colored rubber goods which comprises applying to a form a coating containing a dye-forming constituent, associating the coated form with an aqueous dispersion of rubber to deposit upon the form a layer of rubber, applying to the rubber layer a plurality of complementary dye-forming constituents, allowing the constituents to diffuse into the rubber layer and there to react with the first constituent to form a plurality of dyes in situ.

MERRILL E. HANSEN.
CARL L. BEAL.